United States Patent
Kim et al.

(10) Patent No.: US 8,518,464 B2
(45) Date of Patent: Aug. 27, 2013

(54) METHOD AND SYSTEM FOR MANUFACTURING WHOLE SOY MILK

(76) Inventors: JongHae Kim, Gangwon (KR); Michael J. Kim, Reseda (US)

( * ) Notice: Subject to any disclaimer, the term of this patent is extended or adjusted under 35 U.S.C. 154(b) by 0 days.

(21) Appl. No.: 13/394,973

(22) PCT Filed: Apr. 26, 2010

(86) PCT No.: PCT/KR2010/002592
§ 371 (c)(1),
(2), (4) Date: Mar. 8, 2012

(87) PCT Pub. No.: WO2011/030988
PCT Pub. Date: Mar. 17, 2011

(65) Prior Publication Data
US 2012/0183645 A1    Jul. 19, 2012

(30) Foreign Application Priority Data
Sep. 9, 2009 (KR) ........................ 10-2009-0085114

(51) Int. Cl.
*A23L 1/27* (2006.01)
(52) U.S. Cl.
USPC ............. 426/46; 426/598; 426/634; 426/250; 99/275
(58) Field of Classification Search
USPC ............................ 426/46, 598, 250; 99/275
See application file for complete search history.

(56) References Cited

U.S. PATENT DOCUMENTS
6,582,739 B1    6/2003    Sawano et al.
2006/0002954 A1*   1/2006    Tabata et al. ............. 424/195.15

FOREIGN PATENT DOCUMENTS

| | | |
|---|---|---|
| JP | 59210861 | 11/1984 |
| JP | 2004033107 | 2/2004 |
| KR | 19970064422 | 10/1997 |
| KR | 1019940002528 | 11/1997 |
| KR | 20000031285 | 6/2000 |
| KR | 100455452 | 11/2004 |
| KR | 20050068463 | 7/2005 |
| KR | 100577768 | 5/2006 |
| KR | 100669478 | 1/2007 |
| KR | 100822165 | 4/2008 |
| KR | 20080097963 | 11/2008 |
| KR | 20100008835 | 1/2010 |
| WO | 9941999 | 8/1999 |
| WO | 2006109991 | 10/2006 |

OTHER PUBLICATIONS

Derwent Abstract for CN 101224026. Published Jul. 23, 2008.*
International Search Report for PCT/KR2010/002592, English translation attached to original, Both completed by the Korean Patent Office on Dec. 20, 2010, All together 7 Pages.

* cited by examiner

*Primary Examiner* — Anthony Weier
(74) *Attorney, Agent, or Firm* — Brooks Kushman P.C.

(57) ABSTRACT

A method for manufacturing whole soy milk by sterilizing raw beans with the bean skins by heating in a heating chamber, transforming the starch into soluble dextrin, and then grinding the beans into an ultra-fine particle to be manufactured into whole soy milk. When the starch is transformed into dextrin by means of the above-described method, whole soy milk which is as smooth as bovine milk can be manufactured, said whole soy milk being easier to digest and having an excellent taste and flavor due to the removal of the inherent fishy taste and grassy flavor or "stink" of the beans. By using the entire bean the problem of waste generated in traditional soy milk manufacturing processes is resolved, and soy milk yield is greatly improved. Further, a method is provided for manufacturing whole black soybean milk utilizing the quality anticancer ingredients found in the black bean skins.

20 Claims, 4 Drawing Sheets

METHOD AND SYSTEM FOR MANUFACTURING WHOLE SOY MILK

CROSS-REFERENCE TO RELATED APPLICATION

This application is the U.S. national phase of PCT Appln. No. PCT/KR2010/002592 filed Apr. 26, 2010, which claims priority to Korean application 10-2009-0085114 filed on Sep. 9, 2009 the disclosures of which are incorporated in their entirety by reference herein.

TECHNICAL FIELD

The present invention relates to a system and method for making whole soymilk utilizing bean and its skin together, which method comprises grinding the soy beans with their skin into ultra-fine particles, preferably of a nano scale, after metamorphosing the starch component of the bean into a water-soluble dextrin and sterilizing, using a high pressure rotating heat chamber having an external heating means or an electronic heating means, in which the beans are subjected to roasting and extracting the bean at room temperature for rendering the beans to a porous condition.

BACKGROUND OF THE INVENTION

The conventional method for making soybean milk comprises a step for washing of the beans, removing the skins of the beans by immersing them in water, and boiling and extracting by pressing under hydrothermal conditions.

This kind of manufacturing method makes the problems that about ⅓ of a bean is wasted in the form of a sludge, and at the same time, the nutrient component, including the fiber, the inorganic material etc., was discarded in the form of industrial waste.

To overcome the above problems, a patent (KR 1994-002528) was registered, in which is disclosed collection of the solid material comprising the bean curd dregs by using fermentation in order to solve the loss problem of this nutrient-containing component. And, furthermore a patent (KR 2001-41120) was registered, in which is disclosed to dissolve the solid material of the bean curd dregs by use of conjugated enzymes. However, the above methods have problems that the intrinsic malodorous smell and fishy taste of the beans is not eliminated; and it was also uneconomical to throw the expensive enzyme that are used in the production process for soymilk which is marketed at relatively low price.

Also, a patent (JP59-210861) was published to disclose the method for making soymilk in which an emulsion was mixed while heating, mechanically crushing after defacing the bean eliminating the soybean skin by dipping in water and homogenizing with high pressure.

Another patent (KR 10-0822165) was registered and it discloses a method for making a soymilk in which compressing of beans is carried out in a multi-stage operation using high pressure, while heating with steam, after removal of the bean skin during dipping in water and homogenizing dregs together.

However, all of the above methods need complicated processes with many items of equipment; the malodorous smell is not removed and they have not resolved problems of digesting due to the starch component of the bean; and, also, the prior art processes are unable to effect utilizing of the beans' skin which is containing the protein, the soy-oil and the dietary fiber, and this was rather lost as waste.

This is particularly problematic since in the skin of the black bean is contained, a glycitein, a superior anti-ageing component for the health improvement, but rather the soybean skin had been removed due to the lack of processing technology.

Moreover, a patent (KR10-2005-0068463) was released that discloses how to prepare a soft bean curd using live soy bean powder crushed from the raw beans and boiling with water, but this method has problems in which the bean powders are burning in the heating stage and one cannot make soymilk due to difficulties of filtering and coagulating of the starch of the beans after making the soymilk.

Accordingly, in all of the conventional methods for making soymilk using raw beans, with cooking by heating and squeezing, leaving unresolved the malodorous smell, the intrinsic fishy taste and grassy taste of the beans, as well as digesting problems due to the starch component of the beans. This is leading to customer dissatisfaction.

DETAILED EXPLANATION OF THE INVENTION

Object of the Invention

The object of the present invention is to provide the technology for making a soybean milk after metamorphosing the starch component of the bean into water-soluble dextrin and sterilizing the bean with a heat chamber which is roasting the beans by an external heating means or an electronic heating means, after a cleaning process comprising eliminating impurities, washing and drying, and grinding the whole bean including the bean skin together into an ultra-fine bean particle, preferably nano scale.

Thus, this method is providing a technology for eliminating the malodorous smell such as the fishy smell, or the grassy smell contained in conventional soymilk, improving the digestive action of the soymilk, and substantially enhancing the taste by improving the flavor of the soymilk in accordance with one aspect of the invention.

And also, it provides the useful technology for ingesting a superior anti-aging component (Glycitein) contained in the skin of the black soybean for the production of the soymilk.

Moreover, it provides the technology for manufacturing a soft soy bean milk like a cow milk since the particles of the bean are nano-scale minute, the fragrance and scent to be controlled, and making dairy alternatives for replacing the cow milk and dietary products such as a baby food, ice-cream, yoghurt with the soymilk of the invention.

Technical Solutions

The invention relates to a system and arrangement of apparatus for replacing the conventional sterilization process of soybean milk plant, with the heat chamber of the invention, which is configured to sterilize the soybeans with high temperature after a cleaning process of the beans comprising washing, drying and eliminating impurities. Thereby all of the bacteria parasitizing on the bean are eradicated during this process, and it solves the problem that bacteria proliferate in the precipitation process of the conventional process, and reduces the cost of the system installation by making unnecessary of overhead sterilizers for the manufacturing system of the soybean milk.

Moreover, it provides a manufacturing technology for improving the quality of soymilk by solving the digestive trouble problems of the conventional soymilk, due to the starch component of the bean, eliminating the malodorous smell, such as, the fishy smell or the grassy smell contained in the conventional soymilk, and enhancing the taste by improving flavor through the heating process of over 160 degrees centigrade and metamorphosing the starch component of the bean into the water soluble dextrin.

Also, the invention provides the advantage for saving conspicuously the system manufacturing cost by simplifying the manufacturing process that eliminates the complicated process of boiling and cooling of the soy liquid state of the conventional system.

In addition, the invention improves the quality of the soymilk by utilizing the soybean and its skin together that increases the dietary fiber, protein and anti-ageing component, and increases the yield rate of production since the waste of the sludge, such as, bean curd and bean skin are not produced in the process of this invention.

Moreover, the invention provides the technology of dairy alternatives by replacing the cow milk with the soymilk for making various dairy products since the bean particles of the soymilk of this invention are ultra micro-smashed almost to the cow milk level and mouth-taste feelings are similar to cow milk.

Advantageous Effects

The present invention has the effect to solve the digestive trouble problem since the starch of the bean is metamorphosed to the water-soluble dextrin by heating in the heat chamber using a high temperature.

Also, it has the effect that the manufacturing facility system is simplified and the overhead sterilization process becomes unnecessary since the bacteria parasitic on the bean are completely eradicated in the step of the high temperature heating process.

Moreover, it improves the taste of the soymilk and makes it more delicious, since the starch character of the bean is transformed and the intrinsic malodorous smell of the fishy taste and the grassy smell of the bean is substantially eliminated, and these disappear through the process of roasting the beans at a high temperature in the heat chamber and inflating them by excavation to the room temperature.

Besides, it has the price competitive power since the yield rate is improved over 40% in comparison with the existing soymilk production process since all parts of the soybeans including the skins and the sludge are ground together into nano particles.

Moreover, it has the effect that the cost to build the manufacturing facility is significantly reduced since the manufacturing processor is simple, and the extra-high pressure compression process in multi-phase and boiling/cooling processing are not needed.

Particularly, the invention offers the technology for making the black soybean milk by using the dietary fiber of the ampholyte contained in the soybean and the anti-ageing substance (glycitein) contained in the skin of the black soybean for health.

Also, it provides the technology for making dairy alternatives replacing the cow milk with the soymilk by the process that the bean is ultra micro-smashed to the nano scale particles to be mixed with pure water at high speed and homogenizes to obtain the soymilk substantially devoid of malodorous smells and identically so soft similar to the cow milk. Thereby it offers natural vegetable milk for baby foods and for the peoples who are hesitating to drink cow milk due to the animal growth hormone and the antibiotic agent contained in the cow milk.

In addition, the invention provides the technology to make a new healthy beverage for well-being which preserves the nutrient component of the bean, but the intrinsic malodorous smell eliminated due to molecular bond between the nano particles of the bean and water. Thus, it enables to make entirely new beverages having the nutrient component of the bean, and having a new fragrance and scent combined by added materials such as concentrate of natural fruits or extract of functional materials.

BRIEF DESCRIPTION OF THE DRAWING

The brief explanations of drawings are as follows.

DETAILED DESCRIPTION OF THE PREFERRED EMBODIMENTS

Figure 1:
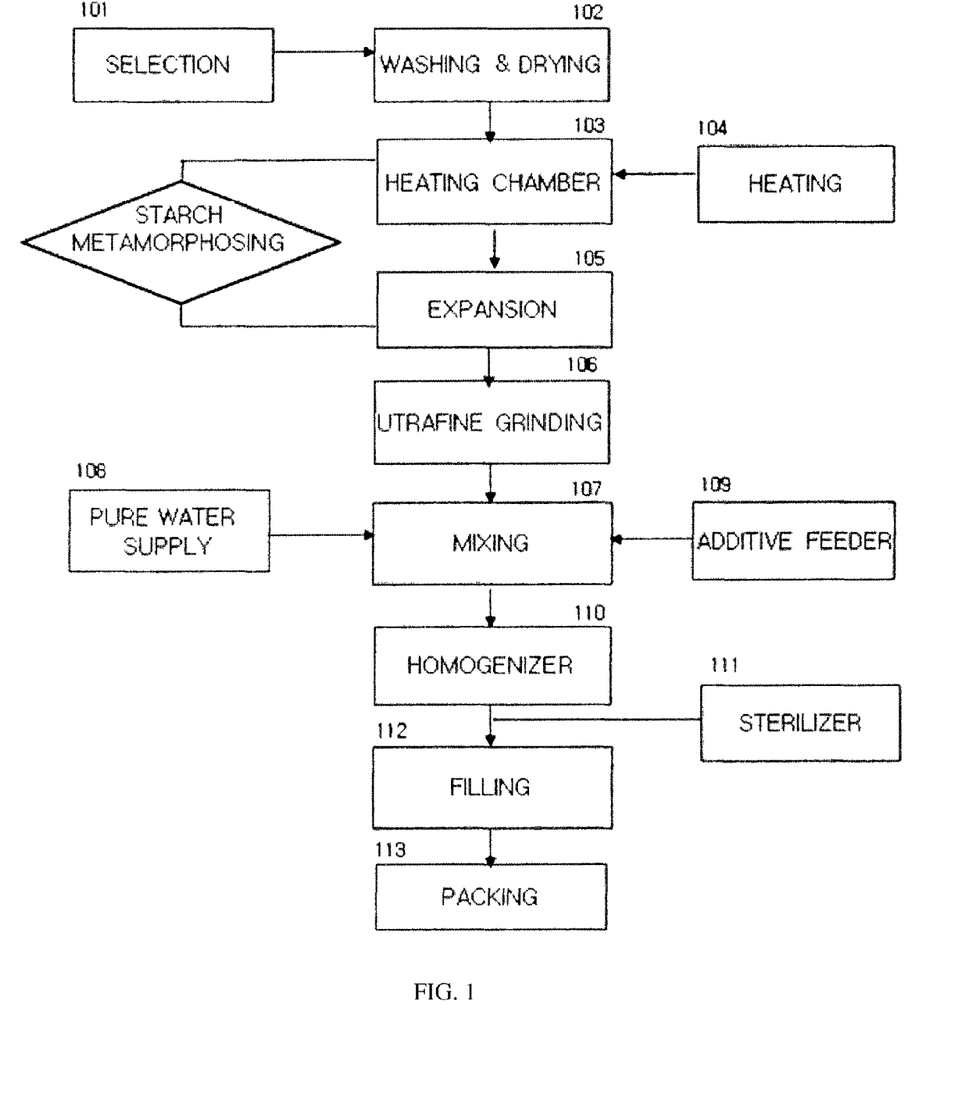
—
FIG. 1 is a system configuration diagram in accordance with one embodiment of the invention.
Figure 2:
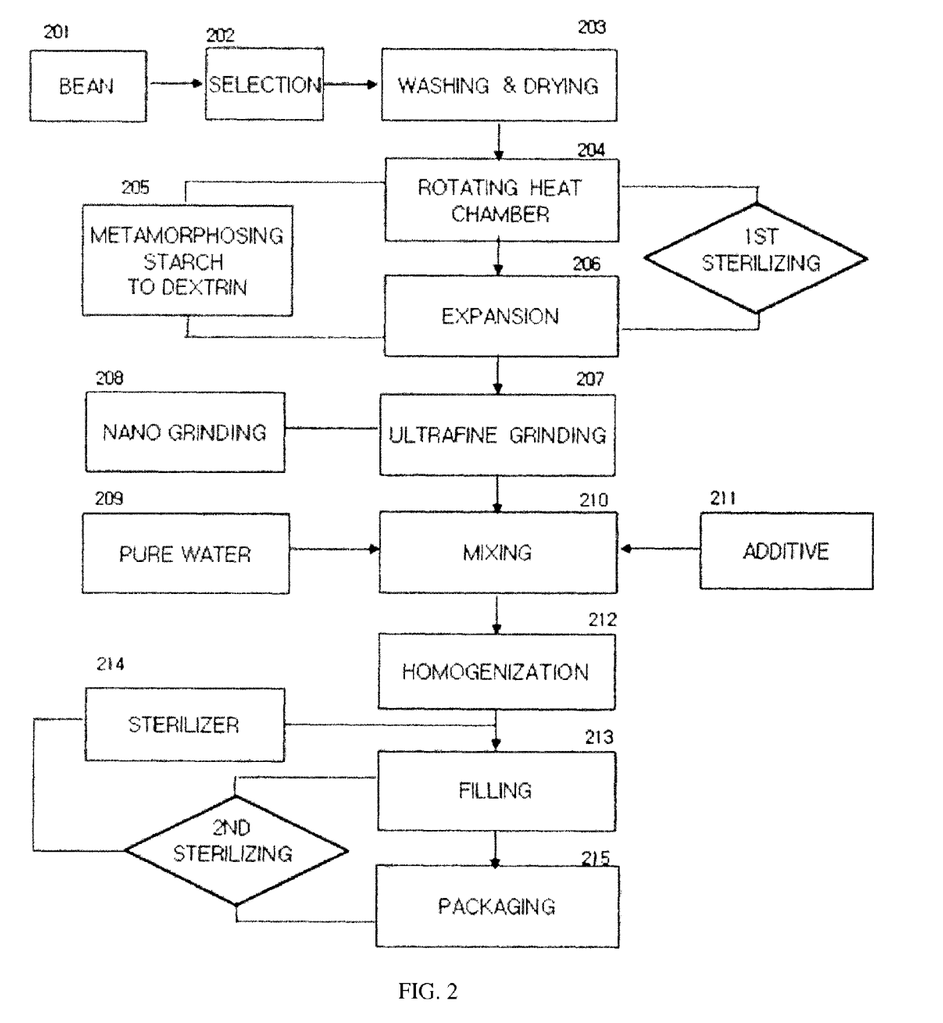
FIG. 2 is production process drawing in accordance with one embodiment of the invention.
Figure 3:
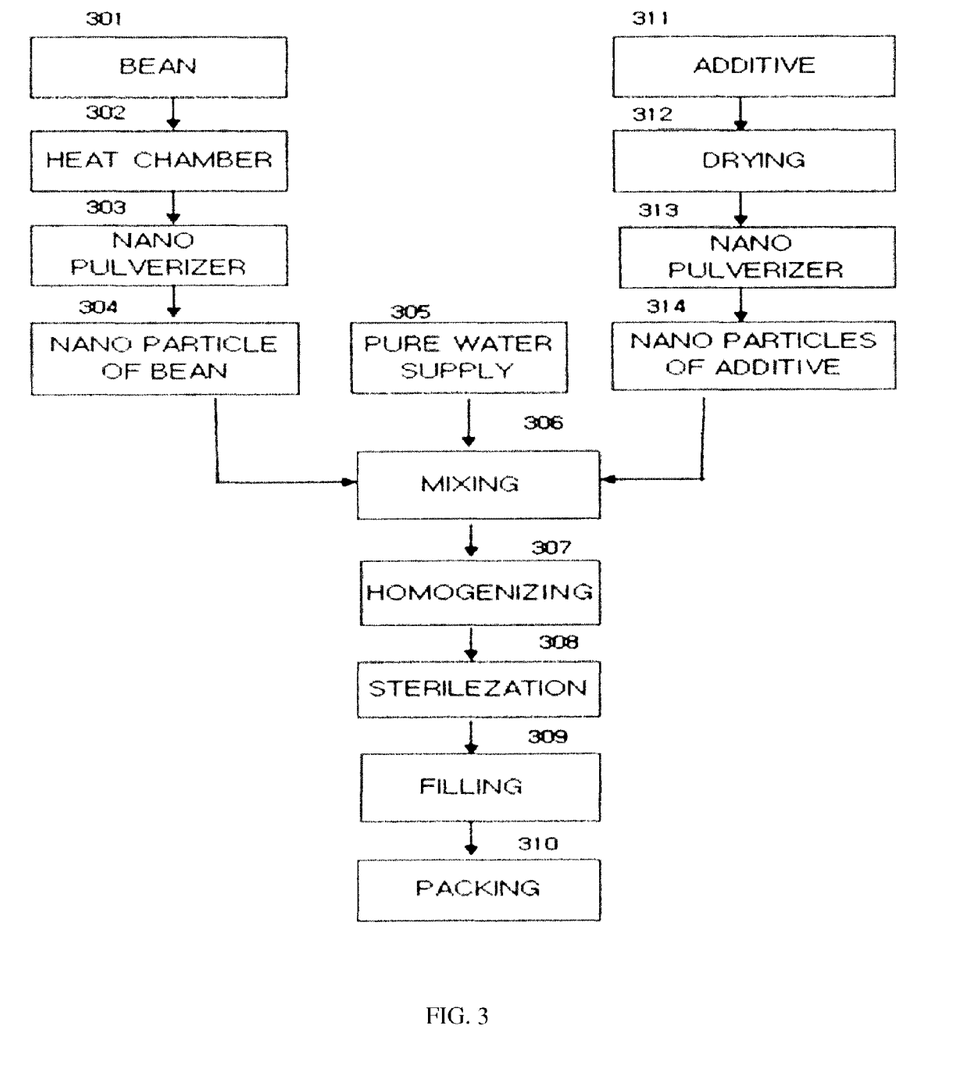
FIGS. 3 and 4 are indicative of the configuration diagrams of systems of typically manufacturing a third beverage with a system of the invention.
Figure 4:
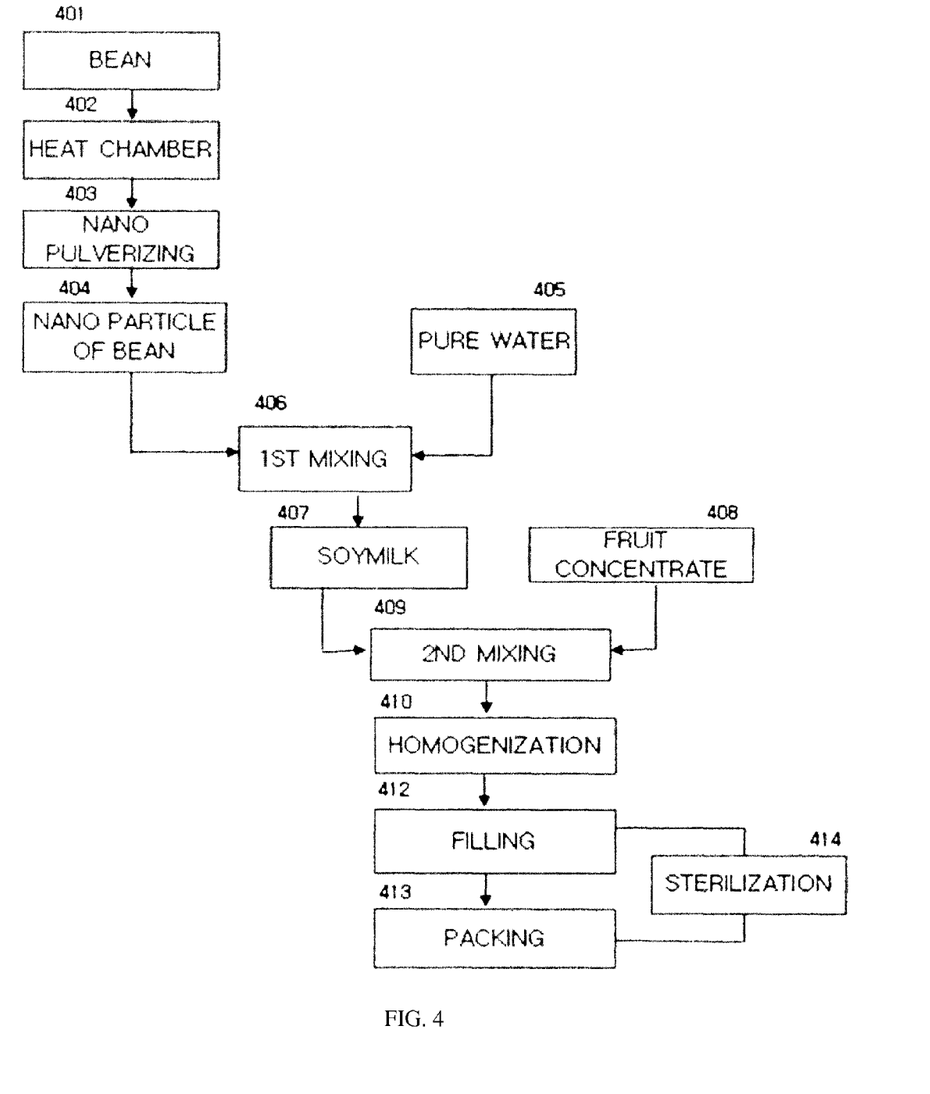

With reference to the figures attached hereto, the configuration of the preferred embodiments, the operations and functions are described in details are as follows. FIG. 1 is a system configuration diagram and FIG. 2 is production process drawing in accordance with one embodiment of the invention. FIGS. 3 and 4 are indicative of the configuration diagrams of systems of typically manufacturing a third beverage with a system of the invention.

Referring to FIG. 1, this invention is comprising; a selecting means (101) for picking out with care the impure or decayed beans; a cleaning means (102) for cleaning the beans by washing with water, steam, or air and drying; a heat chamber (103) for metamorphosing the starch component of the beans into water soluble dextrin and firstly sterilizing the beans by heating; a heating means (104) for heating to a temperature above 160 degree centigrade with the heating chamber; a ultra-fine grinding means (106) for grinding the roasted beans to ultra-fine particle, preferably nano scale; a mixing means (107) for mixing the ultra-fine bean particles and pure water; a homogenizing means (110) for homogenizing the mixed liquid; a sterilizing means (113) for secondly sterilizing the homogenized liquid; and a filling means (112) for filling the mixed liquid in the packaging means (113).

In the system, the heating chamber may variously be designed according to the capacity, pressure and heating temperature of the chamber that is rotating so as to avoid burning.

The heating means may be further comprising a rotating high pressure heat chamber in which roasting of the beans at a high temperature over 160 degree centigrade is carried out with the external heating means during rotating and a expansion means (105) for extracting of the beans into the room temperature for inflating the beans to a porous state, so that in the pertaining step for transforming of the beans to a porous state is achieved, as well metamorphosis of the starch of the bean to the water-soluble dextrin, and thus achieves an improved taste of the soymilk and make it more delicious due to elimination of the intrinsic malodorous smell, also the fishy taste, and the grassy smell of the bean, by means of said processing.

Also the same effect can be obtained even if the heating means comprises an industrial electronic heating means with microwaves for heating the beans to a high temperature to a temperature above 160 degree centigrade.

Also, wherein the mixing neans (107) of this invention, further comprising a high speed agitating means for combining the ultra-fine particles of the bean and the ultra-fine particle or extract of various materials with pure water, a new mixed beverage, having various taste ingredients and effects can be achieved by mixing.

In the configuration, the ultra-fine grinding means (106) for grinding the beans of which the starch component of the beans was transformed into the water-soluble dextrin, may be designed in various model according to the process for making the soymilk.

Referring FIG. 2, in the system composed as described above, the method for making the soymilk is comprising the steps of; selecting (202) for picking out with care the impure, or decayed beans; cleaning (203) for cleaning the bean by washing with water, steam, or air, and drying; metamorphosing (205) the starch component of the beans into the water soluble dextrin by heating to a temperature of above 160 degree centigrade with a heat chamber having a external heating means, and firstly sterilizing the bean by heating; grinding (207) for grinding the beans with their skins, thereby to ensure the metamorphosis of its starch into dextrin, to ultra-fine particle, preferably less than 1,000 nano scale; mixing (210) for combining the ultra-fine bean particles and sterilized water with a high speed mixer; homogenizing (212) for homogenizing the soymilk liquid; and filling (213) for filling the soymilk liquid in the packaging means (215) after secondly sterilizing the homogenized bean liquid with a sterilization means (214).

In the step for metamorphosing (205) a component of starch of the bean into a dextrin there can be used a rotating heat chamber in which roasting of the beans at a high temperature over 160 degree centigrade, with the external heating means; or roasting the beans with skin in the rotating high pressure heat chamber in which roasting of the beans at a high temperature over 160 degree centigrade with the external heating means during rotating and extracting the bean at room temperature for inflating the beans to a porous state, or roasting at a high temperature over 160 degree centigrade with microwaves by industrial electronic ranges.

Moreover, in the step for mixing, the invention provides the technology for producing various soymilk by mixing the ultra-fine particle with ingredients such as grains, sesamum indicum, and perilla frutescens, which are roasted in the heat chamber for metamorphosing the component of starch of the grains into a dextrin and obtaining a sterilization effect by heating.

Also, if it is preferred that the soymilk of various fruit perfumes (such as, orange soymilk, lemon soymilk, cherry soymilk) by mixing the ultra-fine particle of fruits, or concentrates during the mixing step.

If it is preferred that the soymilk of various kinds is inclusive of functional components (such as, broccoli, green tea, ginseng, red ginseng, plum and a chitosan), the ultra-fine particles or extract of the said components can be mixed in during the mixing step.

If it is preferred that the soymilk is inclusive of coffee, or chocolate, it can be mixed in the form of ultra-fine particle, or concentrate, into the soymilk during the mixing stage.

When the various vitamins are mixed, the vitamin soymilk (such as a vitamin C soymilk, a vitamin D soymilk and a multivitamin soymilk) is manufactured simply and it has the effect that the ingestion pattern of vitamins is diversified to the drinking of vitamins, instead of use of the existing tablet state vitamin.

Furthermore, if it is preferred that the soymilk for breakfast, substitute soymilk contain various kinds of grains and supplements, such as vitamins, minerals for a daily requirement thereof, they can be mixed in the form of ultra-fine particle, or concentrate, with soymilk at the mixing stage.

Referring to FIG. 3, the invention offers the method for making a new, third, beverage by raising the partial molecular bond between the ultra-fine bean particles of this invention and ultra-fine particles, preferably below 40 nano scale, of various functional materials, such as, fruits, chocolate, coffee, grains, vegetables, ginseng, green tea or chitosan etc., by mixing in water at high speed.

As shown in FIG. 3, first of all, the method comprises the step for metamorphosing a component of starch of the bean into a dextrin, by heating to a temperature of over 160 degree centigrade, with a heat chamber with sterilizing the beans during the heating process, after a cleaning processing of the beans by washing and drying.

The heating means may be a heat chamber having an external heating means, an electronic heating means, or a rotating high pressure heat chamber, in which the heating of the beans at a high temperature is effectuated during rotating, and extracting of the beans at room temperature for inflating the beans as a porous product.

The heating temperature about the bean is different according to the heating method and nature of the bean. Generally the starch component of the normal bean is metamorphosing into a water soluble dextrin, by heating over 160 degree centigrade and 225 degree centigrade at high pressure heat chamber arrangement.

Due to metamorphosing a component of starch of the bean into a dextrin, it changes the character of the starch and eliminates intrinsic off-flavor of the beans including the grassy smell etc. After the above processing, the beans are ground into the nano-scale preferably below 40 nano by a nano grinding means (303).

The materials (301) to add the beverage which selected among fruit, vegetable, grain, ginseng, green-tea, and broccoli are dried and ground into nano scale particle preferably less than 40 nano scale with a nano grinding means (314).

Accordingly, the nano scale particles (304) of the bean and the nano scale particles of the functional materials (311) are mixed with pure water (305) by the combining rate designed according to the kind and taste of the beverage for manufacturing.

During the above process, the particles of the nano-scale particle of the mixed materials, the nano scale particles of the soybean and the pure water are combining and the molecular bond partly occurs in the mixing step (306) and it makes the third beverage having a new taste.

The size of particles of materials and combining rate are determined according to the property of the material for mixing to design the taste and use of the new beverage, and the size of the nano particles of the materials to suit the design are controlled by setting of the ultrafine nano grinding means (303/313).

As described, the invention provides a technology to make various third beverages containing various fragrance and nutrient components by combining various kinds of ultra-fine nano particles of the material, nano particles of the soymilk, and pure water.

In the process, the object of the expectation can be accomplished by mixing nano scale particles preferably less than 40 nano scales of functional materials which are extracted from a ginseng, a green-tea, a chitosan etc., and flavoring agent including vitamins, coffee, or chocolate etc., can be added if needed for design.

FIG. 4 is a block diagram of another method for manufacturing a third beverage utilizing beans.

As described before, the starch component of the bean is metamorphosing into a dextrin and sterilizing bacteria parasitizing on the bean by heating process between 160-170 degree centigrade with a heat chamber (402) having heating means selected from an external heating means or a rotating high pressure heat chamber in which heating of the beans at high pressure during rotating and extracting of the beans at room temperature for inflating of the beans to be porous.

After roasting, the beans, its starch being metamorphosed into dextrin, are ground into the ultra-fine particle until eliminating deleterious flavors of the beans with nano grinding means.

Generally, scent and aroma of all of edible plants are eliminated by ultra-micro-smashing, since the polymer composite (molecularly imprinted polymers) are changing non-directional scentless, if it is ultra-micro smashed into nano scale particle.

In the sensory inspection, it was observed that the scent and aroma of the soybean became extinct if it is split to below 20 nano under. Therefore, depending on how faithfully one is keeping the intrinsic scent and aroma of the beans, the nano pulverization rate of the roasted bean can be established according to the beverage for manufacturing.

Accordingly, a scentless soymilk is made by a high speed mixing means (405) occurring molecular bonding between the ultra-fine nano particle of the roasted bean and pure water (405).

The third beverage is made by mixing the scentless soymilk and concentrate material or nano particles of the functional materials, such as, fruit of the mango, banana, pineapple, grape, cherry, etc., together according to the taste and kind of the beverage for manufacturing using a high speed mixing means (409), and passing through the high pressure homogenizer (410). Thereby is produced a new beverage which does not have any intrinsic bean smell but is containing the nutrient component of the bean and the functional materials.

According to the scent and taste which one tries to manufacture, the third beverage and the fragrance and nutrition design, it is mixed at various rates. If the fragrance and scent of the soymilk is to be with seasoned, the size of the nano particles of the bean is to be adjusted by controlling the grinding rate for splitting with nano pulverizing means (403), in order to control the taste and scent and fragrance of the soymilk, or mixing the soymilk from which the fragrance and scent are not lost in the second mixing step (409).

Moreover, it provides the useful technology of diversifying by the kind of the third beverage by the way which the various edibility spice, the edible coloring, or the functional materials are being added and mixing at high speed according to the taste of the consumer.

It also provides the technology for manufacturing the third beverage which contains various nutrient components of the soymilk and the functional components of ginseng, green-tea, or other functional materials by the way of combining its extract, or its nano scale particles with the soymilk.

Furthermore, it provides the soymilk which is so soft like cow milk because of its ultra-fine particles which are less than 40 nano-scale and the scent and fragrance are controlled arbitrarily, so that it replaces the cow milk for manufacturing dietary products including the various baby foods, ice creams, yoghurts, or etc.

In the invention, the terminology "bean" is including all kinds of beans such as capiulum, pea, horse bean, phaseoli radiati semen, adzuki bean, black soybean, lima bean, and Egyptian beans, etc.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be the embraced therein.

WORKING EXAMPLE 1

After cleaning soybeans with water and drying, the beans with their skin are roasted in a rotating high pressure heat chamber at a temperature of 225 degree centigrade at a pressure of at least 1.1 MPa, using an external gas heating arrangement and extracting the roasted beans at room temperature to obtain a porous bean product and ground the roasted bean into 40 nano grade with a nano pulverizer and, mixed with pure water utilizing a high speed mixer and then passed through a high pressure homogenizer. The soymilk that is obtained is substantially devoid of malodorous smells, such as, grassy smell intrinsic to the bean and is substantially alike to soft, natural cow milk,

WORKING EXAMPLE 2

After cleaning soybeans with water and drying, the beans are roasted with the skins in the rotating heat chamber in which roasting of the beans at high temperatures of 160-170 degree centigrade, without any pressure and they are ground into 30 nano grade with a nano pulverizer and mixed with pure water and passed through a high pressure homogenizer.

There was obtained the soymilk as dairy alternative which is substantially devoid of malodorous smells, such as, grassy and fishy smells usually intrinsic of the bean, and which is as soft as natural cow milk.

WORKING EXAMPLE 3

The orange concentration liquid was mixed with the above soymilk of the working example 2, at the capacitance ratio of 25%, and passed through a high pressure homogenizer. Consequently, the soft orange soymilk, like a cocktailed orange juice, was obtained.

WORKING EXAMPLE 4

The chitosan powder grinded into 40 nano-scales was mixed to the soymilk of the Example 1, at the weight ratio 5% rate, and passed through a high pressure homogenizer. Consequently, the soft chitosan soymilk, which do not influence the taste of the soymilk, were obtained.

WORKING EXAMPLE 5

The green tea powder ground to 40 nano-scale was mixed with the soymilk of the working example 1, at the weight ratio 3% rate, and passed through a high pressure homogenizer. Consequently, the soft green tea soymilk having a soft green color was obtained and drinking of this was giving the feeling as being soft as cow milk.

WORKING EXAMPLE 6

After cleaning of the soybeans and drying, the beans with the skins are roasted in the high pressure heat chamber in which roasting of the beans at a high temperature of over 225 degree centigrade at the pressure of 1.1 MPa, and the roasted beans are extracted into the room temperature for inflating the bean to the porous condition, and the roasted beans are ground into 20 nano scale and mixed with pure water to obtain soymilk.

The orange concentration liquid was mixed with the above soymilk, at the weight ratio 25%, and passed through a high pressure homogenizer. Consequently, the new beverage having an orange flavor, without any smell of bean, was obtained.

INDUSTRIAL APPLICABILITY

1. When a coagulating agent (the chloride salt, sulphate, GDL etc.) is added to the soymilk of the invention, it makes a soft bean curd with improved digestive power since the starch is transformed into dextrin, and the material cost is reduced by up to 40% due to using the bean and its skin together for production, therefore the invention is applicable to the bean curd industry.

2. The present invention provides the technology for making various new beverages to replace the existing carbonated drinks which are prohibited for sale in schools. Therefore, the invention is applicable to a new health beverage industry in making various beverages with fruit perfume, or a chocolate scent for replacing the carbonate drinks.

3. This invention is applicable to diary alternative industry for replacing the existing cow milk which may be containing animal growth hormones and antibiotic agents.

The animal hormones and the antibiotic agents contained in the cow milk are transferring to human body through the milk and it makes people hesitate to drink cow milk and to make baby food.

Therefore, the invention provides the solution to replace the cow milk with soymilk for making various dairy alternatives.

4. This invention is applicable to the vitamin industry for replacing the existing tablet vitamins with a drinkable vitamin which is part of the soymilk for easy drinking.

5. This invention is applicable for third beverage industry for providing various functional beverages for health, such as, a ginseng drink, a green-tea drink and etc., by occurring molecular bonding between the nano particles of the roasted bean and water, and raising nano polymer structure of the materials in non-directional scentless.

6. This invention is applicable to a new well-being beverage industry for providing various functional beverage for health by combining concentrates of various fruits, or spices, since all of the intrinsic smells of the bean disappear when the beans are roasted and ultra micro-smashed, preferably nano scale under 20 nano, but containing the nutrient components of the beans for well-being.

7. It can be applicable to the dairy product processing industry for making ice-cream, sherbet, yogurt, baby food and etc., using the soymilk of the invention since the soymilk of the invention is as soft as cow milk and substantially never gives digesting problems.

REFERENCE NUMERALS LIST

[FIG. 1]
101: selecting means.
102: washing and drying means.
103: heating chamber.
104: heating means.
105: expansion means.
106: ultra-fine grinding means.
107: mixing means.
108: pure water supply.
109: additive feeder.
110: homogenizer.
111: sterilizer.
112: filling means.
113: packing means.
[FIG. 2]
201: bean.
202: selection.
203: washing and drying.
204: rotating heat chamber.
205: metamorphosing starch to dextrin.
206: expansion.
207: ultra-fine grinding.
208: grinding means.
209: pure water.
210: mixing.
211: additive.
212: homogenization.
213: filling.
214: sterilizer.
215: packaging.
[FIG. 3]
301: bean.
302: heat chamber.
303: nano pulverizer.
304: nano particle of bean.
305: pure water supply.
306: mixing means.
307: homogenizing means.
308: sterilization means.
309: filling means.
310: packing means.
311: additive.
312: drying.
313: nano pulverizer.
314: nano particles of additive.
[FIG. 4]
401: bean.
402: heat chamber.
403: nano pulverizing.
404: nano particle of bean.
405: pure water.
406: first mixing.
407: soymilk.
408: fruit concentrate.
409: second mixing.
410: homogenization.
412: filling.
413: packing.
414: sterilization.

What is claimed is:

1. A method for manufacturing a soymilk utilizing 100% of beans and with their skins together, the method comprising:
   (1) drying the beans with their skins after washing and eliminating impurities from the beans,
   (2) metamorphosing a component of starch of the beans into dextrin by heating with a heat chamber having a heater selected from the group consisting of an external heater and an electronic heater, and sterilizing the beans during heating,
   (3) grinding the beans, with starch metamorphosed into dextrin, to ultra-fine particles with a nano grinder,
   (4) mixing the ultra-fine particles of the beans and sterilized water with a high speed mixer to form a mixed soy liquid, (5) homogenizing the mixed soy liquid with a homogenizer to form a homogenized soymilk, and (6) sterilizing the homogenized soymilk for filling in a packaging process.

2. The method of claim 1, wherein the heater further comprises a rotating high pressure heat chamber in which heating of the beans to a temperature at least 160 degrees centigrade is effectuated during rotating, the beans being subsequently extracted into room temperature conditions to render the beans porous.

3. The method of claim 1, wherein in the mixing step (4), the ultra-fine particles of the beans are mixed with grain, a functional material selected from the group consisting of ginseng and green tea, or a spicy material selected from the group consisting of coffee and cocoa after drying and grinding.

4. The method of claim 1, wherein in the mixing step (4), the ultra-fine particles of the beans are mixed with a fruit concentrate selected from the group consisting of mango, papaya, banana, pineapple, grape, lemon, and orange.

5. The method of claim 1, wherein in the mixing step (4), the ultra-fine particles of the beans are mixed with a material selected from the group consisting of vitamins, a dietary fiber, unsaturated fatty acids, chitosan, calcium, taurine, lecithin, and extracts thereof.

6. A system for manufacturing a soymilk utilizing 100% of beans with their skins to together, comprising:
(1) a component for metamorphosing a component of starch of the beans and bean skins into a dextrin, by a heater with a heat chamber to form metamorphosed beans and sterilizing the metamorphosed beans and bean skins during heating,
(2) a component for grinding the metamorphosed beans into nano scale particles with nano grinding means, and
(3) a component for forming molecular bonding between the nano scale particles of the metamorphosed beans and water with a high speed agitator and a homogenizer.

7. The system of claim 6, wherein the heat chamber further comprising a rotating high pressure heat chamber in which heating of the beans at high temperature during rotating is effectuated, and extracting the beans into room temperature conditions for inflating the beans to porous conditions.

8. A method for manufacturing a bean beverage having nano scale bean articles and addible materials the method comprising:
(1) metamorphosing a component of starch of the bean into dextrin by a heater selected from the group consisting of a heat chamber having an external heater and a rotating high pressure heat chamber in which the beans are heated at high temperature with rotation, the beans being subsequently extracted into room temperature conditions for inflating of the beans to be porous, and sterilizing the beans during heating process to form metamorphosed bean particles,
(2) grinding the metamorphosed bean particles into nano scale particles with nano grinder,
(3) mixing the nano scale particles of a dried material selected from the group consisting of fruit, vegetable, grain and herb that are grinded into nano scale with nano grinder,
(4) forming molecular bonding between sterilized water and the nano scale particles selected from the group consisting of metamorphosed bean particles and the dried material with a high speed agitator and a homogenizer.

9. The method of claim 8, wherein the mixing step (3) mixes concentrated material selected from the group consisting of fruits and vegetables instead of the dried material.

10. A method for manufacturing a beverage having beans, the method comprising:
(1) metamorphosing a component of starch of the beans into dextrin by a heater selected from the group consisting of a heat chamber and a rotating high pressure heat chamber in which heating of the beans at room temperature inflates the beans to be porous, and sterilizing the beans during the heating,
(2) grinding the beans until the beans lose malodorous taste and flavor with a nano grinder,
(3) forming molecular bonds between the nano scale particles and sterilized water by mixing with a high speed agitator to produce a soymilk,
(4) mixing a concentrate material selected from the group consisting of fruit and vegetable to the soymilk from step (3) with the high speed mixer for producing a beverage, and
(5) homogenizing the beverage from step 4 and sterilizing for subsequent filling and packing.

11. The method of claim 10, wherein the mixing step (4) further includes mixing ultra-fine particles of a material selected from the consisting of fruits, vegetables, and functional materials.

12. The method of claim 10, wherein the mixing step (4) further includes mixing a material selected from the group consisting of extracts of emulsifiers, enzymes, spices, and edible color for homogenizing.

13. The method of claim 10, wherein the mixing step (4) further includes mixing an artificial spice of milk smell for producing artificial milk.

14. The method of claim 1, wherein the ultra-fine particles are less than 1,000 nano meters.

15. The method of claim 1, wherein the ultra-fine particles are less than 40 nano meters.

16. The method of claim 1, wherein the ultra-fine particles are less than 20 nano meters.

17. The method of claim 8, wherein the nano scale particles are less than 40 nano meters.

18. The method of claim 8, wherein the nano scale particles are less are than 20 nano meters.

19. The method of claim 10, wherein the metamorphosing step (1) includes heating to a temperature of at least 160 degrees centigrade.

20. The method of claim 10, wherein the nano scale particles are less than 1000 nano meters.

* * * * *